(12) United States Patent
Andersen et al.

(10) Patent No.: US 11,169,428 B2
(45) Date of Patent: Nov. 9, 2021

(54) SQUEEZED LIGHT GENERATOR AND METHOD FOR GENERATING SQUEEZED LIGHT

(71) Applicant: Danmarks Tekniske Universitet, Kgs. Lyngby (DK)

(72) Inventors: Ulrik Lund Andersen, Virum (DK); Tobias Gehring, Charlottenlund (DE); Christian Scheffmann Jacobsen, Kgs. Lyngby (DK)

(73) Assignee: Danmarks Tekniske Universitet, Lyngby (DK)

( * ) Notice: Subject to any disclaimer, the term of this patent is extended or adjusted under 35 U.S.C. 154(b) by 0 days.

(21) Appl. No.: 16/769,902

(22) PCT Filed: Dec. 18, 2018

(86) PCT No.: PCT/DK2018/050374
§ 371 (c)(1),
(2) Date: Jun. 4, 2020

(87) PCT Pub. No.: WO2019/120418
PCT Pub. Date: Jun. 27, 2019

(65) Prior Publication Data
US 2020/0387045 A1 Dec. 10, 2020

(30) Foreign Application Priority Data
Dec. 18, 2017 (EP) ...................................... 17208067

(51) Int. Cl.
*G02F 1/35* (2006.01)
*G02F 1/39* (2006.01)

(52) U.S. Cl.
CPC .............. *G02F 1/353* (2013.01); *G02F 1/392* (2021.01)

(58) Field of Classification Search
CPC . G02F 1/353; G02F 2001/392; G02F 2201/16
See application file for complete search history.

(56) References Cited

U.S. PATENT DOCUMENTS 6,710,914 B2 * 3/2004 Arbore ...................... G02F 1/39
359/330
9,720,437 B2 * 8/2017 Gilbert .................. G02F 1/0136
(Continued)

OTHER PUBLICATIONS

Hidehiro Yonezawa et al., "Generation of squeezed light with a monolithic optical parametric oscillator: Simultaneous achievement of phase matching and cavity resonance by temperature control," Opt. Express 18, p. 20143-20150 (2010) (Year: 2010).*
(Continued)

*Primary Examiner* — Daniel Petkovsek
(74) *Attorney, Agent, or Firm* — Blank Rome LLP (57) ABSTRACT

A squeezed light generator (SLG) for generating squeezed light (SQL) is disclosed, said squeezed light generator (SLG) comprising: —a waveguide (WG) being arranged to receive fundamental wavelength laser light (FWL), the waveguide (WG) comprising a second harmonic generator (SHG) for generating second harmonic light (SHL) from the fundamental wavelength light (FWL), —an optical cavity (OC) resonant for both fundamental wavelength light (FWL) and the second harmonic light (SHL), the optical cavity (OC) being arranged to receive the second harmonic light (SHL), and —a parametric down converter (PDC) arranged inside said optical cavity (OC), the parametric down converter (PDC) being adapted for generating said squeezed light (SQL) using said second harmonic light (SHL). Also, a method for generating squeezed light (SQL) is disclosed.

19 Claims, 5 Drawing Sheets

(56) References Cited

U.S. PATENT DOCUMENTS

| | | | |
|---|---|---|---|
| 9,983,052 B1* | 5/2018 | Brown | G01S 17/89 |
| 10,007,170 B2* | 6/2018 | Zielinska | G02F 1/3501 |
| 10,175,556 B2* | 1/2019 | Reimer | G02F 1/365 |
| 2006/0153573 A1 | 7/2006 | Tomaru | |
| 2011/0032532 A1 | 2/2011 | Hirano et al. | |

OTHER PUBLICATIONS

Ling-An Wu et al., "Generation of Squeezed States by Parametric Down Conversion", Phys. Rev. Lett. 57, pp. 2520-2523, Nov. 17, 1986 (Year: 1986).*

International Search Report and Written Opinion for PCT/DK2018/050374, dated Mar. 11, 2019, 10 pages.

A. R. Wade, et al., "A Squeezed Light Source Operated under High Vacuum", Scientific Reports, www.nature.com/scientificreports; Dec. 14, 2015, 6 pgs.

S. Suzuki, et al., "7 dB Quadrature Squeezing at 860 nm with Periodically-Poled $KTiOPO_4$", Aug. 15, 2006, 4 pgs.

S. Dwyer, et al., "Squeezed Quadrature Fluctuations in a Gravitational Wave Detector using Squeezed Light", Optics Express, Aug. 12, 2013, vol. 21, No. 16, 14 pgs.

G. S. Kanter, et al., "Squeezing in a $LiNbO_3$Integrated Optical Waveguide Circuit", Optics Express, Feb. 11, 2002, vol. 10, No. 3, 6 pgs.

H. Vahlbruch, et al., "Detection of 15 dB Squeezed States of Light and their Application for the Absolute Calibration of Photoelectric Quantum Efficiency", Physical Review Letters, PRL 117, Nov. 8, 2001, 2016, 6 pgs.

J. Arnbak, et al., "Compact, Low-Threshold Squeezed Light Source", Optics Express, vol. 27, No. 26, Dec. 23, 2019. 9 pgs.

G. Masada, et al., "Efficient Generation of Highly Squeezed Light with Periodically Poled $MgO:LiNbO_3$", Optics Express, vol. 18, No. 12, Jun. 7, 2010, 8 pgs.

* cited by examiner

SHL   SQL

Fig. 3B

SHL   SHL

SQUEEZED LIGHT GENERATOR AND METHOD FOR GENERATING SQUEEZED LIGHT

RELATED APPLICATIONS

This application is a national phase of PCT/DK2018/050374, filed on Dec. 18, 2018, which claims the benefit of European Application No. 17208067.3, tiled on Dec. 18, 2017. The entire contents of those applications are hereby incorporated by reference.

FIELD OF INVENTION

The invention relates to generation of squeezed light and squeezed light generators

BACKGROUND

The Poisson noise or shot noise is a limiting factor for light states generated by standard lasers. In several applications, a lower noise level is desirable, for example for extreme sensing, quantum information processing, quantum communication, and fundamental tests of quantum theory. Squeezed light states have been used to get beyond this limitation.

Several examples of setups for generation of squeezed light states are known in the art.

For example, US 2011/0032532 A1 discloses a quantum entanglement generating system which generates quantum entangled beams from a first and second squeezed light beams.

Another example is, US 2006/0153573 A1 which relates to a squeezed light generating method by means of the Kerr effect, i.e. a chi(3) effect.

However, a number of challenges still exists. For example, such known systems may be both bulky and relatively unstable. Thus, the use of many such systems can be challenging in real life implementations and even in laboratory conditions.

Furthermore, an improvement of the degree of squeezing is highly desirable as it improves results and opens for new applications.

Thus, it is an object of the present invention to solve the above problems.

SUMMARY

The invention relates to a squeezed light generator for generating squeezed light, said squeezed light generator comprising:
- a waveguide being arranged to receive fundamental wavelength laser light, the waveguide comprising a second harmonic generator for generating second harmonic light from the fundamental wavelength light,
- an optical cavity resonant for both fundamental wavelength light and the second harmonic light, the optical cavity being arranged to receive the second harmonic light, and
- a parametric down converter arranged inside said optical cavity, the parametric down converter being adapted for generating said squeezed light using said second harmonic light.

One advantage of the invention is that a compact but highly efficient squeezed light generator is provided. Particularly, the degree of squeezing may be superior to previously seen solutions, while at the same time reducing the size of the setup, e.g. to as little as a 19-inch rack implementable system.

Particularly, an advantage of the present invention is that the squeezed light generator can generate squeezed light having a noise level of more than 6 dB below the shot noise level, or even more than 10 dB below. Thus, a very high degree of squeezing can be realized. This may be done while at the same time having a very small and stable setup.

A further advantage of the invention is that by utilizing a waveguide implemented second harmonic generator, only a single pass of the fundamental wavelength light is necessary to obtain a sufficient degree of conversion into second harmonic light, e.g. about 10%. Thereby an effective, yet compact generation of second harmonic light is realized.

Also, an advantage of the present invention is that an efficient down conversion is obtained resulting in an efficient generation of squeezed light. This is realized by using a parametric down converter positioned inside an optical cavity resonant for both the generated squeezed light as well as the second harmonic light, which is used as the pump for the squeezed light generation.

A further advantage of the invention may be that by using a waveguide implemented second harmonic generator, phase modulation may be done by the same unit as the second harmonic generator, e.g. by using a second harmonic generator with a piezoelectric chi(2) material.

A further very significant advantage of the invention is that a compact setup is obtained without having to use a very powerful input. This may be obtained by a combination of the second harmonic generator in a waveguide and the parametric down converter being arranged in a cavity resonant for both the fundamental and the second harmonic light. Particularly, using the waveguide implemented second harmonic light generation improves compactness, but without the need for a very high-power input of fundamental wavelength light. At the same time impressive squeezing levels of the squeezed light output may be obtained.

Still, a further advantage of the invention is that the combination of a waveguide implemented second harmonic generator and a double resonant cavity for the parametric down converter allows an effective squeezing while maintaining long term stability. This is facilitated by requiring only a single cavity, i.e. the cavity of the parametric down converter.

Further, using a cavity implemented parametric down converter provides a minimized loss compared e.g. to solutions where the parametric down converter is arranged in a waveguide.

As used herein the term "fundamental wavelength light" is intended to refer to light having wavelength defined as the fundamental wavelength, i.e. twice the wavelength of the second harmonic wavelength, which comes from a laser light source. It is noted that the fundamental wavelength light is not intended to refer to the squeezed light, even if this may have the same wavelength. Thus, the term "fundamental wavelength light" may refer to classical, i.e. un-squeezed, light of the fundamental wavelength.

As used herein the term "second harmonic light" is intended to refer to light having wavelength defined as the second harmonic wavelength, i.e. half the wavelength of the fundamental wavelength.

As used herein the term "squeezed light" is intended to refer to light obeying sub-Poissonian noise statistics, and thus having a noise level below the shot noise level, e.g. even more than 10 dB below the shot noise level. In some embodiments, the squeezed light has a wavelength equal to the fundamental wavelength, whereas in other embodiments, the squeezed light is composed of two wavelengths together corresponding to the second harmonic wavelength.

As used herein the term "resonant" is intended to refer to the properties of the optical cavity being tuned to support the wavelengths for which it is resonant. Particularly, the optical cavity is resonant in the sense that the mirrors forming the cavity have a high reflectivity for the resonant wavelengths, and that the phase matching between the cavity and the light of these wavelengths can be obtained.

As used herein the term "second harmonic generator" is used in its usual meaning. It is configured to generate second harmonic light from the fundamental wavelength light. Typically, the second harmonic generator comprises a non-linear optic crystal, and may typically be formed by a chi(2) material.

As used herein the term "parametric down converter" is used in its usual meaning. The parametric down converter is configured to generate squeezed light using the second harmonic light as a pump. It is noted that a parametric down converter is operated below lasing threshold. The parametric down converter comprises a nonlinear optic crystal, and may be formed by a chi(2) material.

As used herein the term "chi(2) material" is a nonlinear optical crystal having a chi(2) different from zero. Several different examples of such materials are mentioned herein and may be used to obtain the desired wavelengths of the second harmonic light and squeezed light. Some chi(2) nonlinear materials are also piezoelectric, and may thus be used to modulate the light it is used with.

As used herein the term "optical cavity" is intended to have its conventional meaning, i.e. an arrangement of two or more mirrors for producing multiple reflections of light to give multiple roundtrips. The optical cavity is resonant in the sense that the mirrors forming the cavity usually have a high reflectivity for the resonant wavelengths, and that the optical round-trip length of the cavity is an integer multiple of these wavelengths. It is noted that cavities may be arranged as a linear cavity (of two or more mirrors) or as a more complex cavity, such as a ring cavity. An example of a compact ring cavity is the so-called bow-tie cavity.

According to an advantageous embodiment of the invention the squeezed light generator comprises means for receiving said fundamental wavelength light from an external laser light source.

An advantage of the above embodiment is that a compact squeezed light generator may be obtained, when not depending on an internal laser light source. Particularly, when using more than one squeezed light generator in the same overall setup, using an external laser light source may be highly advantageous, as it not only saves the number of laser light sources needed, but also facilitates a higher degree of matching characteristics of the squeezed light from the different squeezed light generators, e.g. with respect to phase, frequency etc.

According to an alternative embodiment the fundamental wavelength light may be generated by a laser light source integrated in said squeezed light generator.

An advantage of the above embodiment is that a flexible squeezed light generator may be obtained, when not depending on an external laser light source.

According to an embodiment of the invention, the laser light source is a continuous wave laser light source.

According to an advantageous embodiment of the invention said waveguide and said optical cavity are arranged such that said second harmonic light results from fundamental wavelength light passing through said waveguide once.

One advantage of the above embodiment may be that noise and modulations induced by e.g. multiple reflections in a cavity may be avoided while still having a relatively high efficiency of second harmonic generation, e.g. about 10% of the optical power of the fundamental wavelength light.

Thus, according to the above embodiment, the waveguide is not located in e.g. an optical cavity. Instead, the fundamental wavelength light passes through the waveguide, where the second harmonic generator is located. A fraction of the fundamental wavelength light is converted to second harmonic light, which propagates to the optical cavity. Thus, the second harmonic light received in said optical cavity, results from fundamental wavelength light passing through the waveguide only once. In cases where some back reflection of fundamental wavelength light into said waveguide occurs, thus may result in further second harmonic light, which however, does not reach the optical cavity. Thus, a single-pass setup with respect to the waveguide and the second harmonic generator is realized.

According to an embodiment the second harmonic generator(s) comprises a chi(2) material, for example beta barium borate (BBO), lithium niobate (LiNbO3), potassium titanyl phosphate (KTP=KTiOPO4), or lithium triborate (LBO=LiB3O5). While efficient conversion into second harmonic light is important, a key factor when choosing the material for the second harmonic generator is the desired wavelength of the squeezed light and thus the desired wavelength of the pump therefore, i.e. the second harmonic light.

According to an embodiment of the invention the parametric down converter is based on a chi(2) material.

One advantage of the above embodiment may be that a smaller pump power, i.e. power of the second harmonic light, may be sufficient to obtain squeezed light. This helps to keep the squeezed light generator compact, as a waveguide implemented second harmonic generation may be used. At the same time, very efficient squeezing of the light may be obtained.

According to an embodiment of the invention, the wavelength of the squeezed light is between 200 and 2500 nm. Examples of usable wavelengths include 780 nm, 795 nm, 800-860 nm, such as 860 nm, 964 nm, 1064 nm, 1300 nm, 1340 nm, and 1550 nm. Naturally, it should be understood that the present invention may be used to generate squeezed light having other wavelengths, and that the above merely illustrate a few illustrative examples of applicable wavelengths.

According to an embodiment of the invention, the parametric down converter comprises a chi(2) material, for example lithium niobate (LiNbO3), such as magnesium doped lithium niobate, or potassium titanyl phosphate (KTP=KTiOPO4). Naturally, it should be understood that the above merely represents a few illustrative examples of applicable chi(2) materials for use in the parametric down converter, and that other materials may be used as well. Also, it should be understood that different kinds of phase matching may be used, including type I phase matching, type II phase matching, and quasi phase matching, which are all well-known techniques. The specific type may be selected depending e.g. on the applicable wavelengths, parametric down converter, etc.

Examples of usable laser light sources include Nd:YAG lasers, Erbium doped fiber lasers, Ti:Sapphire lasers, Nd:YAP lasers, Nd:YVO4 lasers. Naturally, it should be understood that the above merely represents a few illustrative examples of applicable laser light sources, and that other laser light sources may be used as well.

According to an advantageous embodiment of the invention said squeezed light has a wavelength equal to the fundamental wavelength light.

One advantage of the above embodiment may be that light squeezing may be simpler to obtain, e.g. due to less complex phase matching criteria. Also, the optical cavity need only be resonant for two wavelengths, i.e. fundamental wavelength and the second harmonic wavelength.

According to an advantageous embodiment of the invention said optical cavity comprises at least two mirrors, wherein the at least two mirrors comprises a squeezed light outcoupling mirror and a second harmonic outcoupling mirror.

According to an embodiment of the invention, the squeezed light outcoupling mirror and the second harmonic outcoupling mirror is the same mirror.

According to an embodiment of the invention, the optical cavity (OC) is formed by two, three, or four mirrors (MIR).

According to an advantageous embodiment of the invention said parametric down converter comprises a reflective surface forming one of the mirrors.

One advantage of this is that it facilitates obtaining a compact, yet efficient squeezed light generator.

Thus, it should be understood that the bulk portion of the parametric down converter is inside in the optical cavity thus influencing the light inside. Typically, however, at least one mirror external from the parametric down converter is beneficial, as this allows the cavity length to be adjusted to obtain a resonance condition.

According to an embodiment of the invention, the parametric down converter comprises two opposite reflective surfaces forming the mirrors of the optical cavity.

According to an advantageous embodiment of the invention, the optical cavity is formed by two mirrors (MIR), and wherein said parametric down converter comprises two reflective surfaces at opposite ends forming the two mirrors.

In such embodiments, the resonance condition of the optical cavity may be obtained by tuning the frequency of the fundamental wavelength light.

According to an advantageous embodiment of the invention the optical cavity comprises two stand-alone mirrors and wherein the parametric down converter is positioned in the optical path between the mirrors.

According to an advantageous embodiment of the invention the optical cavity is a ring cavity, such as a bow-tie cavity.

Thus, the optical ring cavity has the advantage that it has two distinct directions of propagation of the light. This is advantageous, e.g. because the effects of backscattered light, e.g. from downstream experiments, may be avoided or minimized due to the opposite propagation direction compared to the second harmonic light and the squeezed light. Thus, a more robust device may be obtained. Ring cavities also allow more flexibility with respect to the input beam, which may be in-coupled in any of the mirrors used.

According to an advantageous embodiment of the invention the optical cavity is a bow-tie cavity.

The bow-tie cavity benefits from being a ring cavity and further allows a relatively long cavity yet compact setup. The bow-tie cavity is a ring cavity formed by four stand-alone mirrors, with the optical path crossing itself to form a bow-tie.

According to an advantageous embodiment of the invention the squeezed light generator further comprises a phase modulator for modulating the phase of the fundamental wavelength laser light or the second harmonic light.

One advantage of the above embodiment is that an efficient squeezed light generator is obtained, which can achieve phase modulation in a relatively simple and reproducible way to obtain cavity locking, e.g. in accordance with the Pound-Drever-Hall technique. Regardless of whether the phase of the fundamental wavelength laser light is modulated before second harmonic generation or the phase of the second harmonic light is modulated, this results in a modulation of the phase of the second harmonic light.

According to an advantageous embodiment of the invention said phase modulator is integrated into the second harmonic generator.

According to an advantageous embodiment of the invention said phase modulator comprises a piezo-electric modulator arranged with the second harmonic generator, e.g. by means of a piezo-electric chi(2) material having metal electrodes forming the second harmonic generator.

Thus, in the above advantageous embodiment, the phase modulator comprises the piezo-electric modulator, which may or may not be part of the second harmonic generator. The piezo-electric modulator may e.g. be provided as metal electrodes on the nonlinear crystal of the second harmonic generator together with a suitable electronic circuit configured to apply a voltage between the metal electrodes.

One advantage of the above embodiment is that it conveniently facilitates obtaining a compact squeezed light generator by providing second harmonic generation and a cavity locking control unit in the form of the phase modulator in a single unit. Also, the embodiment provides a phase modulation which subsequently may be employed as part of a cavity locking control unit. By demodulating a detected signal from the optical cavity with the control signal on the phase modulator on the second harmonic generator, an error signal is obtained, which may be used to control actuation of a mirror of the optical cavity to adjust the cavity length whereby cavity locking is obtained.

In one embodiment, the phase modulator comprises a piezo-electric chi(2) material, which forms the second harmonic generator.

In an alternative embodiment, a non-piezoelectric second harmonic generator, e.g. comprising by a non-piezoelectric chi(2) material, is coupled to a separate piezoelectric material with suitable electrodes for control. This allows acoustic waves to be induced into the non-piezoelectric second harmonic generator.

According to an advantageous embodiment of the invention the squeezed light generator further comprises a squeezed angle locker configured to control a squeezing angle of the squeezed light, the squeezed angle locker comprising
 a feedback measurer arranged to measure a feedback on an optical probe extracted from the optical cavity and
 a phase shifter arranged to adjust the phase of the optical probe before the optical cavity.

An advantage of the above embodiment is that controlling the squeezing angle of the squeezed light makes the squeezed light significantly more useful for applications where the squeezing angle needs to be known.

According to an advantageous embodiment of the invention the squeezed light generator further comprises an optical separator for extracting a portion of the fundamental wavelength light before the second harmonic generator for use as the optical probe.

An advantage of the above embodiment may be that having a phase reference of the initial light may be highly advantageous, e.g. by enabling further control of the system, such as control of the squeezing angle of the squeezed light, without having to measure on the squeezed light directly.

In an example embodiment, the extracted portion of the fundamental wavelength light may be about 1 percent of the optical power of the fundamental wavelength light. Of course, depending on the circumstances, a higher or a lower fraction of the light may be extracted.

According to an embodiment of the invention, the optical probe is an extracted portion of the fundamental wavelength light, e.g. corresponding to about 1 percent of the optical power of the fundamental wavelength light, or a higher or lower fraction of the fundamental wavelength light. Of course, depending on the circumstances, a higher or a lower fraction of the light may be extracted. Advantageously, the extracted portion of the fundamental wavelength light is subjected to an acousto-optic modulator arranged to shift the frequency of the the extracted portion, e.g. by increasing the frequency with a fixed value, which, as an example, could be about 40 MHz. Other values may be used as well. Thereafter, the optical probe may be subjected to a phase shifter, and then injected to the optical cavity to interact with the parametric down converter. By measuring the interacted optical probe, and controlling the phase shifter in accordance therewith, the angle of squeezing of the squeezed light may be locked and controlled.

According to an advantageous embodiment of the invention the squeezed light generator is fiber implemented.

According to an embodiment of the invention said fiber implementation comprises fiber couplings between the second harmonic generator and the optical cavity and between the optical cavity and an output. I.e. the light is guided at least a portion of the distance between the second harmonic generator and the optical cavity and between the optical cavity and an output.

According to a further embodiment said fiber implementation comprises fiber couplings between a laser source delivering said fundamental wavelength light and the second harmonic generator.

According to an alternative embodiment, the squeezed light generator is free space implemented.

According to an advantageous embodiment of the invention the squeezed light generator further comprises at least one optical circulator or beam splitter arranged to extract a portion of the second harmonic light from the optical cavity.

One advantage of the above embodiment may be that cavity length locking of the optical cavity may be obtained by controlling the squeezed light generator based on the portion of second harmonic light extracted by the optical circulators.

Optical circulators are well-known and may e.g. be based on the Faraday effect.

Preferably, back-reflected second harmonic light from the optical cavity is used, whereas transmitted second harmonic light may also be used.

In an alternative embodiment, a tap-off of a small portion, e.g. a few percentage of optical power, of the squeezed light may serve as a source of error signals, which can be used for cavity length locking of the optical cavity and pump phase locking.

According to an embodiment of the invention, the squeezed light generator further comprises a temperature controller for controlling the temperature of the parametric down converter. The temperature controller comprises heating and/or cooling means, which can be operated to ensure the correct temperature of the parametric down converter. An advantage thereof is that the phase matching condition may be satisfied.

According to an embodiment of the invention, the frequency of the squeezed light corresponds to the frequency of the fundamental wavelength light.

The invention further relates to a method for generating squeezed light, said method comprising the steps of
a) receiving fundamental wavelength light,
b) generating second harmonic light from the fundamental wavelength light in a waveguide,
c) receiving in an optical cavity the second harmonic wavelength light,
d) converting the second harmonic light into squeezed light by means of a parametric down converter positioned in the optical cavity,
wherein the optical cavity is resonant for both the fundamental wavelength light and the second harmonic wavelength light.

According to an advantageous embodiment of the invention, the method for generating squeezed light is performed using a squeezed light generator according to the invention or any of its embodiments.

According to an advantageous embodiment of the invention, the squeezed light generator is configured to operate in accordance with the method of the invention or any of its embodiments.

FIGURES

The invention will now be described with reference to the figures where.

DETAILED DESCRIPTION

Figure 1:
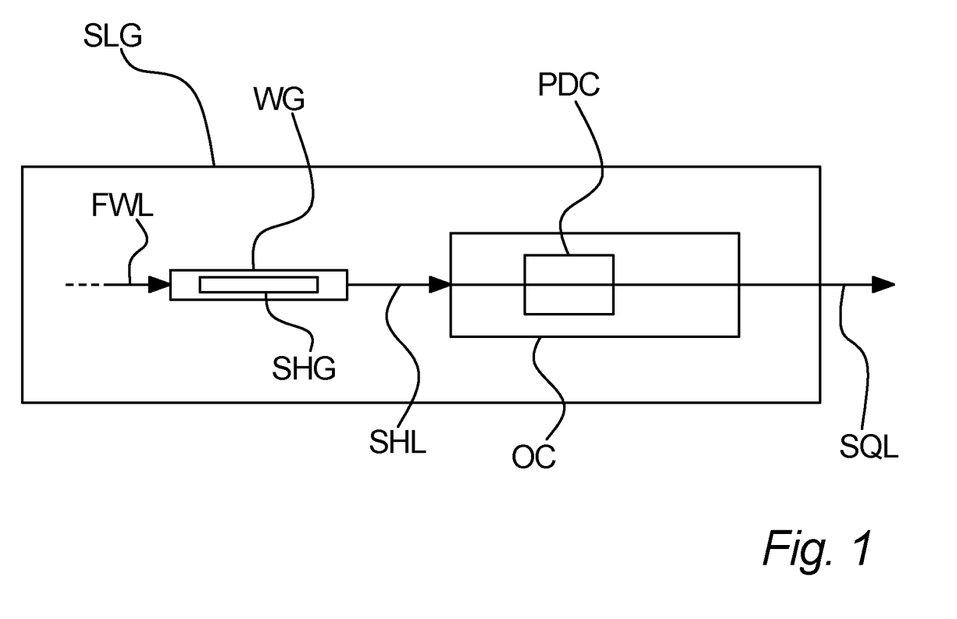
FIG. 1 illustrates a squeezed light generator SLG according to an embodiment of the invention.

Referring to FIG. 1, a squeezed light generator SLG according to an embodiment of the invention is illustrated. The squeezed light generator SLG comprises a waveguide WG, an optical cavity OC, and a parametric down converter PDC.

The waveguide WG is arranged to receive fundamental wavelength laser light FWL, either from an internal or from an external light source LLS. The use of external and internal laser light sources LLS is illustrated on FIG. 2A-2B. The waveguide WG comprises a second harmonic generator SHG for generating second harmonic light SHL from the fundamental wavelength light FWL.

The optical cavity OC is arranged to receive the second harmonic light SHL and is resonant for both fundamental wavelength light FWL and the second harmonic light SHL. The parametric down converter PDC is arranged inside said optical cavity OC, and the parametric down converter PDC is adapted for generating said squeezed light SQL using said second harmonic light SHL. Several possible setups for the optical cavity OC usable within the embodiment of FIG. 1 exists, some of which are illustrated on FIGS. 4A-4C.

It is noted that the squeezed light generator SLG typically may comprise various optical redirection devices (e.g. mirrors, prisms) for conveniently forming the most suitable optical path allowing the squeezed light generator SLG to include desired components while having small and suitable overall dimensions, e.g. fitting suitable standards, such as the 19 inches rack structures. Thus, dimensions are not to scale, but made illustrative.

Figure 2A:
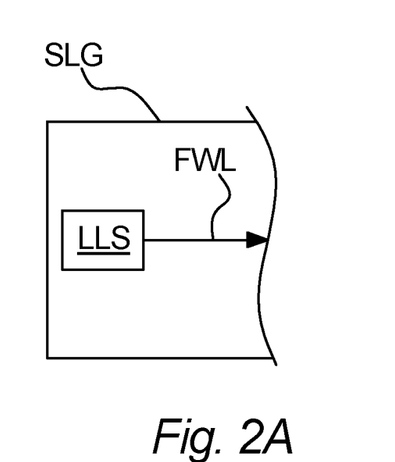
FIG. 2A-2B illustrate use of internal or external laser light source LLS.

Referring to FIG. 2A, a part of a squeezed light generator SGL comprising an internal laser light source LLS is illustrated.

Figure 2B:
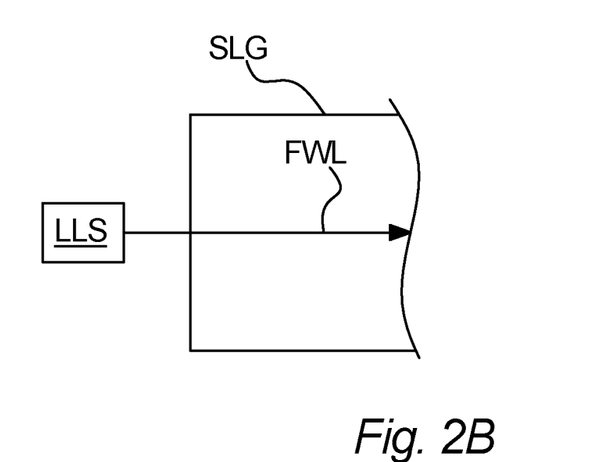

Referring to FIG. 2B, a part of a squeezed light generator SGL without an internal laser light source LLS is illustrated. Instead, the squeezed light generator SGL receives fundamental wavelength light FWL from an external laser light source LLS.

Figure 3A:
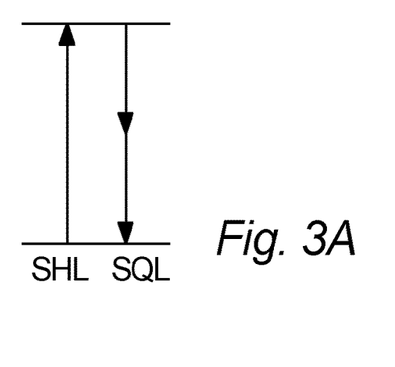
FIG. 3A-3B illustrate generation of squeezed light SQL being wavelength degenerate or not.
Figure 3B:
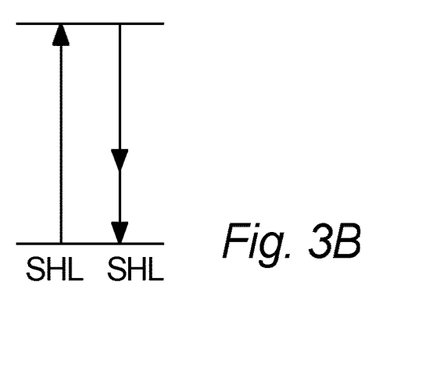

Referring to FIGS. 3A and 3B, these illustrate that the energy of one photon of second harmonic light SHL corresponds to the sum of energies of the two generated photons of squeezed light SQL using one photon of second harmonic light SHL.

FIG. 3A shows an embodiment where the two generated photons of squeezed light SQL are frequency degenerate, whereas FIG. 3B shows an embodiment where the two generated photons of squeezed light SQL has different frequencies.

Figure 4A:
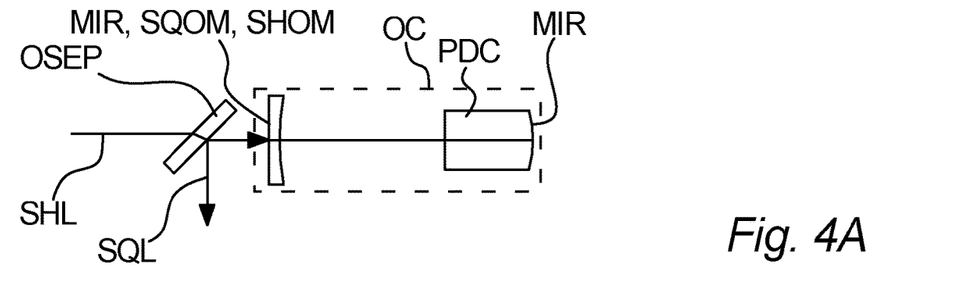
FIG. 4A-4C illustrate configurations of optical cavities OC according to different embodiments of the invention.
Figure 4B:
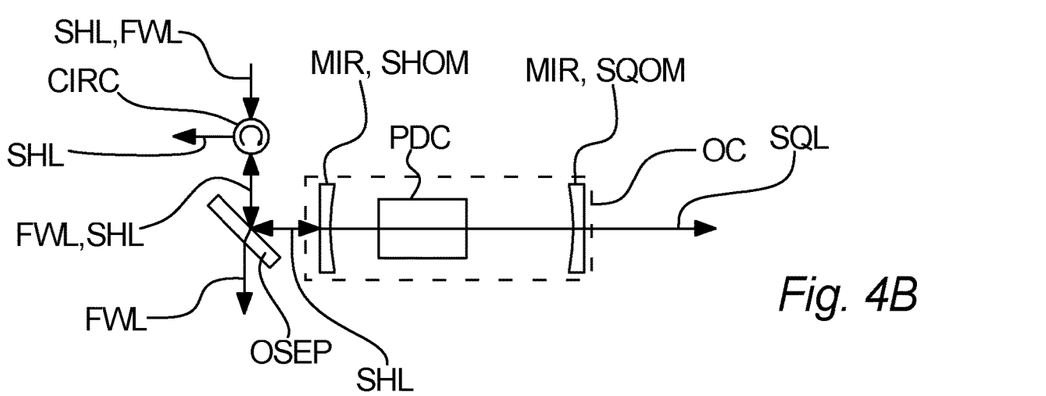
Figure 4C:
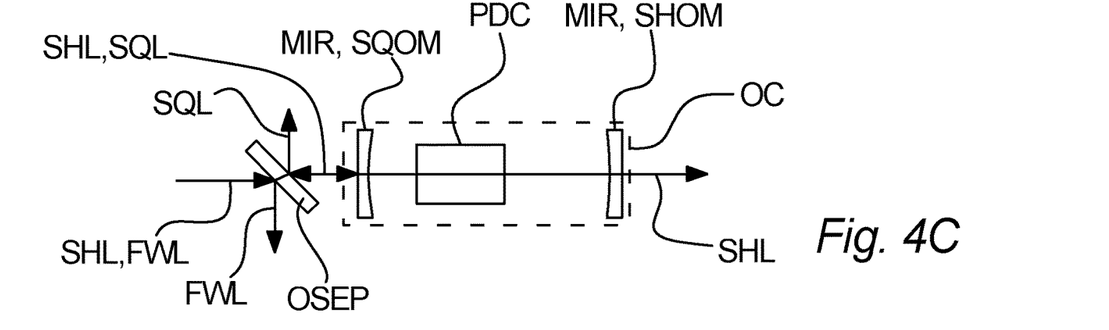

FIGS. 4A-4C show possible configurations for optical cavities OC usable within the embodiment of FIG. 1. The configurations shown on FIGS. 4A-4C may be used with a squeezed angle locker SAL, e.g. as illustrated in connection with FIG. 9.

In FIG. 4A, one end surface of the parametric down converter PDC forms a mirror MIR which is highly reflective, such as about 100%, for both second harmonic light SHL and squeezed light SQL. Further the optical cavity OC comprises a mirror MIR forming a second harmonic outcoupling mirror SHOM and a squeezed light outcoupling mirror SQOM. Desirably, an optical separator OSEP positioned to the left thereof is used to separate the second harmonic light SHL from the squeezed light SQL.

In FIG. 4B, the optical cavity comprises two mirrors MIR, the left mirror MIR being a second harmonic outcoupling mirror SHOM, and the right mirror MIR being a squeezed light outcoupling mirror SQOM.

The second harmonic outcoupling mirror SHOM desirably has a very high reflectivity for squeezed light SQL, such as about 100%, whereas it has a lower reflectivity, such as e.g. about 97.5%, for second harmonic light. Similarly, the squeezed light outcoupling mirror SQOM desirably has a very high reflectivity for second harmonic light SHL, such as about 100%, whereas it has a lower reflectivity, such as e.g. about 90%, for squeezed light.

An optical circulator CIRC is used to separate outcoupled second harmonic light SHL from the incoming beam of second harmonic light SHL. The second harmonic light SHL and the fundamental wavelength light FWL shown incoming from the top is allowed to pass through, whereas second harmonic light SHL from the optical cavity OC is deflected towards the left and thus separated.

An optical separator OSEP in the form of a further mirror is positioned to the left of the second harmonic outcoupling mirror SHOM. This may perform the purpose of separating fundamental wavelength light FWL from the laser light source LLS away from the second harmonic light SHL being fed to the optical cavity OC.

In FIG. 4C, a setup somewhat similar to that of FIG. 4B is shown. Here, the second harmonic outcoupling mirror SHOM and the squeezed light outcoupling mirror SQOM are interchanged. When the fundamental wavelength light FWL and the squeezed light SQL have the same wavelength, the optical separator OSEP is configured to separate both the fundamental wavelength light FWL from the second harmonic light SHL before the optical cavity OC, and also to separate the squeezed light SQL from the output of the optical cavity OC.

Alternatively, it is also possible e.g. to use an end surface of the parametric down converter PDC as a second harmonic outcoupling mirror SHOM and/or as a squeezed light outcoupling mirror SQOM. In fact, it is possible to use a parametric down converter PDC having two opposite ends forming mirrors, which forms the optical cavity OC.

In some embodiments, it may be desirable to use more complicated cavities e.g. with one or more additional mirrors. This may serve to increase the effective cavity length without increasing the dimensions of the overall squeezed light generator SLG. Also, using a ring cavity setup, having a fixed direction of propagation of the second harmonic light and the squeezed light, has the advantage that the effects of backscattered light, e.g. from downstream experiments, may be avoided or minimized due to the opposite propagation direction compared to the second harmonic light and the squeezed light.

Figure 5:
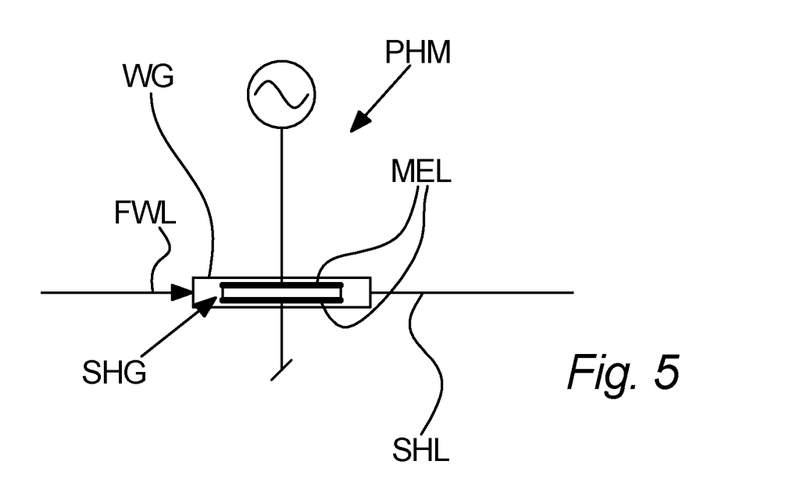
FIG. 5 illustrates a phase modulator PHM according to an embodiment of the invention.

Turning now to FIG. 5, a further embodiment is illustrated where the second harmonic generator SHG also comprises a phase modulator PHM, such that the generation of the second harmonic light SHL and modulation of the phase thereof is realized in a single unit.

This may be realized, as shown in FIG. 5, by using a second harmonic generator SHG comprising a piezoelectric chi(2) material having metal electrodes MEL. The voltage over the piezoelectric chi(2) material is adjusted by connecting a supply of alternating current to the metal electrodes MEL.

This allows the phase of the second harmonic light SHL to be manipulated as the effective refractive index of the piezoelectric chi(2) material changes with the applied voltage.

Modulating the phase of the second harmonic light SHL is one step of obtaining locking of the optical cavity, and helps to prevent frequency drifts of the optical cavity OC for the squeezed light SQL.

Figure 6:
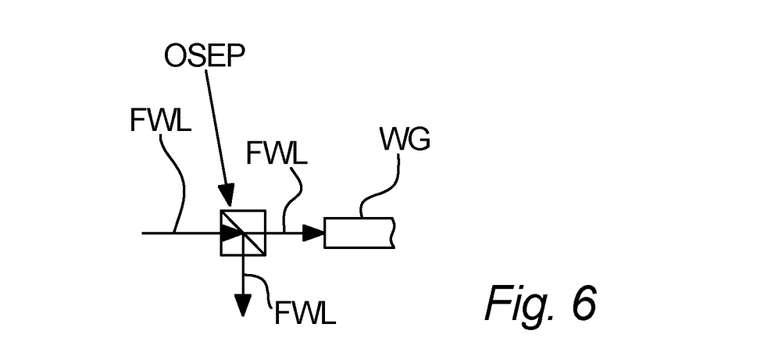
FIG. 6 illustrates splitting off a portion of fundamental wavelength light FWL according to an embodiment of the invention.

Turning to FIG. 6, here it is shown that a portion, e.g. about 1 percent of the optical power of the fundamental wavelength light FWL is split off before the waveguide WG by means of an optical separator, such as a beam splitter. Of course, depending on the circumstances, a higher or a lower fraction of the light may be extracted.

Figure 9:
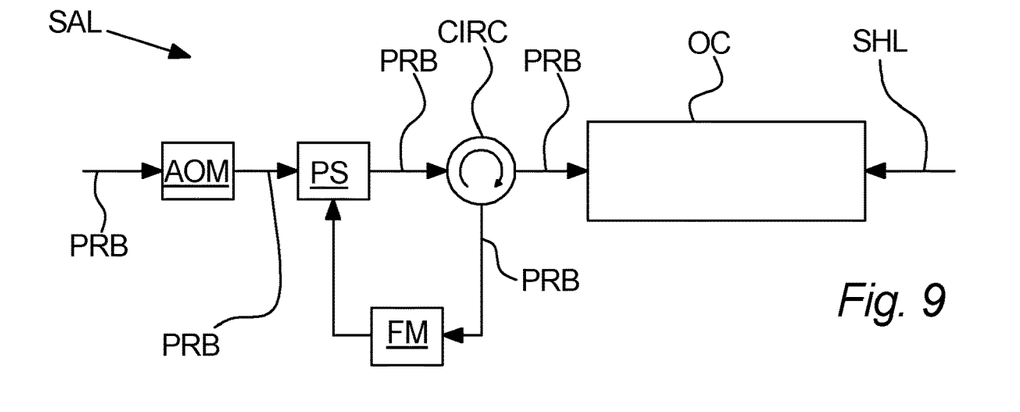
FIG. 9 illustrates a squeezed angle locker SAL according to an embodiment of the invention.

The split off portion of the fundamental wavelength light FWL may be frequency shifted, and then injected as an optical probe into the optical cavity OC to serve as a reference for the squeezed quadrature angle. An example of such a setup is shown in FIG. 9. As an alternative to frequency shifting the beam, either a second laser phase locked to the fundamental laser with some offset frequency could be used or a single-sideband could be generated from the fundamental laser light by a means of a single sideband modulator (e.g. comprised of an amplitude or phase modulator or using an I/Q modulator (in-phase, quadrature component modulator)) or an acousto-optical modulator. Incoupling of second harmonic light SHL from the right is shown in FIG. 9. It is noted that the embodiment of FIG. 9 may be combined with any of the optical cavity setups shown FIGS. 4A-4C.

Figure 7:
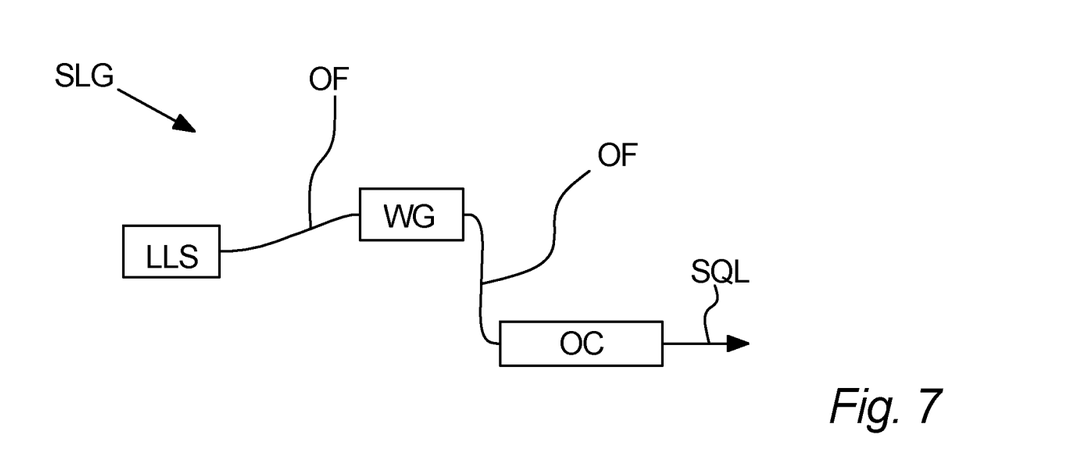
FIG. 7 illustrates a fiber implemented squeezed light generator SLG according to an embodiment of the invention.

Referring to FIG. 7, a fiber implemented squeezed light generator SLG according to an embodiment of the invention is illustrated. The squeezed light generator may be devised as that of the embodiment of FIG. 1. The squeezed light generator SLG comprises a laser light source LLS, which may be internal or external as described with FIG. 2A-2B, a waveguide WG and an optical cavity OC. The light from the laser light source LLS is conveyed to the waveguide WG in an optical fiber OF. Similarly, the light from the waveguide WG to the optical cavity OC is fiber coupled, i.e. the light propagates on an optical fiber. The output of the optical cavity OC may be free space as shown or fiber coupled. When an external laser light source LLS is used, the fundamental wavelength light FWL may be delivered to the squeezed light generator SLG by fiber or free space.

Figure 8:
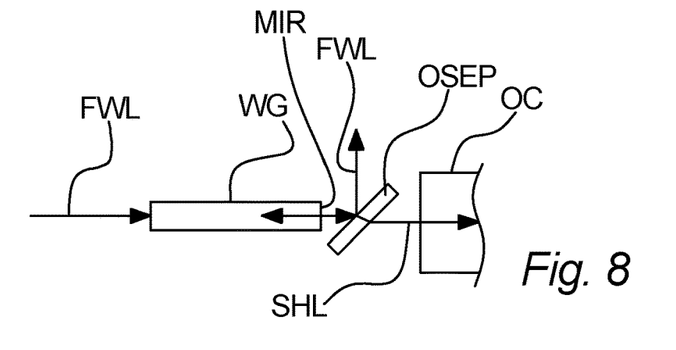
FIG. 8 illustrates filtering off fundamental wavelength light FWL after the second harmonic generator SHG according to an embodiment of the invention.

Turning to FIG. 8, a further embodiment of the invention is illustrated. Further to the embodiment illustrated on FIG. 1, FIG. 8 shows an optical separator OSEP inserted between the waveguide WG and the optical cavity OC. The optical separator OSEP has a high reflectively for the fundamental wavelength light FWL, while having a low reflectivity for the second harmonic light SHL.

Also, the end surface of the waveguide WG forms a high reflective mirror MIR for reflective for the fundamental wavelength light FWL, while having a low reflectivity for the second harmonic light SHL.

In some embodiments, only one of fundamental light mirror MIR and the optical separator OSEP may be used. Other means for filtering out the fundamental wavelength light FWL, possibly in combination with the above, may also be used.

On FIG. 9, an example of a squeezed angle locker SAL for controlling the angle of the squeezed light SQL is shown according to an embodiment of the invention.

A split off portion of the fundamental wavelength light FWL (splitting off not shown) is used as an optical probe PRB. First, it passes to an acousto-optic modulator AOM. The acousto-optic modulator AOM is adjusted to shift the frequency of the fundamental wavelength light e.g. a frequency in the order of tens of MHz, such as increasing the frequency by for example about 40 MHz. The optical probe PRB is then phase shifted by the phase shifter PS.

Then, the optical probe PRB is injected into the optical cavity OC, where it may interact with the parametric down converter PDC. The part of the optical probe PRB being outcoupled back from the optical cavity OC is extracted using an optical circulator CIRC. The squeezed angle locker SAL includes a feedback measurer FM arranged to measure on the extracted part of the probe PRB. The phase shifter PS receives a control signal based on the measurement performed by the feedback measurer FM and is configured to adjust the induced phase shift in the optical probe PRB accordingly. Thereby, the angle of the squeezing may be controlled to a fixed value, which may be altered to a desired value.

It is noted that FIG. 9 shows only the squeezed angle locker SAL and the optical cavity OC, and that the squeezed angle locker SAL may be implemented in the setup of e.g. FIGS. 4A-4C. It is noted though that in some embodiments, the optical probe PRB extracted from the optical cavity OC may extracted in transmittance, depending on the setup. When using the setup of FIG. 4A, the optical probe PRB may advantageously be injected to the optical cavity through the mirror MIR formed by the parametric down converter PDC.

Figure 10:
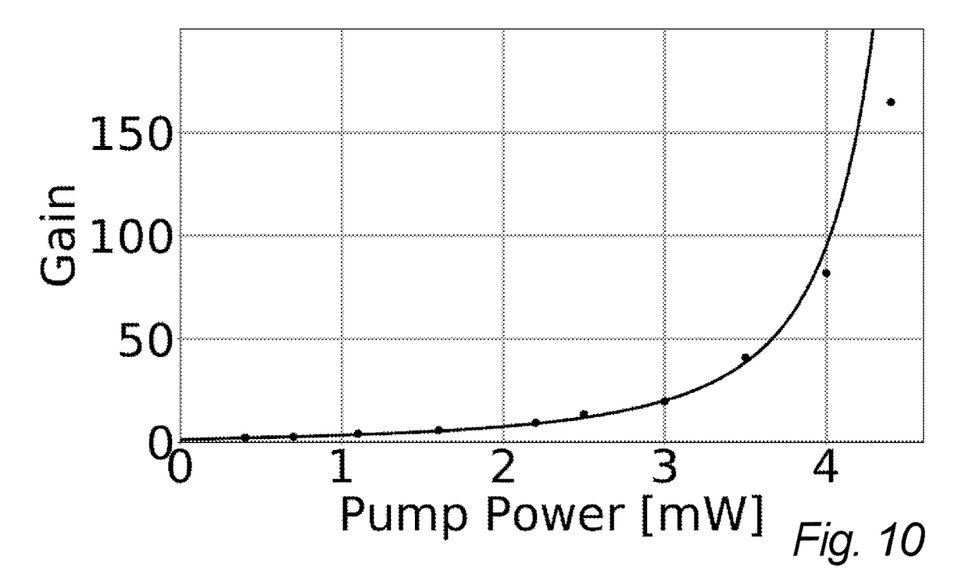
FIG. 10 illustrates the classical gain of the squeezed light source.

FIG. 10 shows the classical gain of the squeezed light source. The squeezed light source consisted of a linear optical cavity formed by a periodically poled potassium titanyl phosphate crystal (as the parametric down converter) which was curved and high reflective coated for both wavelengths, and a curved coupling mirror with 10% transmissivity for the fundamental wavelength at 1550 nm and 2% transmissivity for the pump at 775 nm. The parametric down converter was heated to about 40 degrees Celsius to obtain phase matching and ensure that both wavelengths, the fundamental wavelength light and the second harmonic light as the pump were simultaneously resonant in the cavity. The pump was generated in a periodically poled lithium niobate waveguide and injected into the squeezed light source optical cavity from the partially reflective coupling mirror. A dichroic beam splitter in the path separated the pump from the squeezed light. The classical gain was measured by injecting a beam of the fundamental wavelength in the highly reflective mirror on the crystal and detecting the beam in reflection of the dichroic mirror. The gain is thereby given by the ratio of the amplified beam power of the fundamental wavelength and the power measured without pump. Points correspond to measurements and the solid line depicts a theory model fitted to the data. The graph shows that a low oscillation threshold in the mW range can be reached which is a requirement for generating a high squeezing degree with a pump generated in a waveguide.

Figure 11:
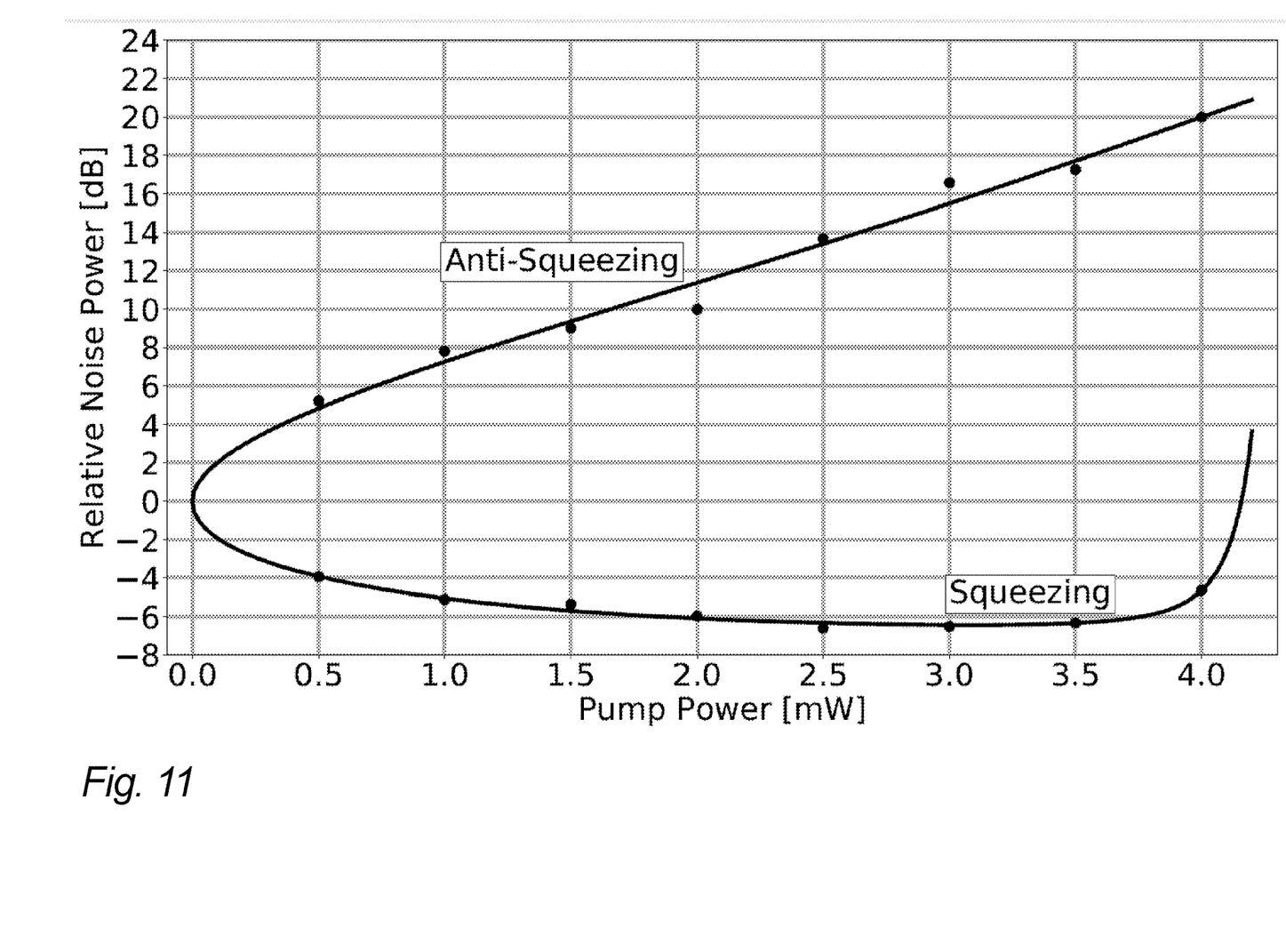
FIG. 11 illustrates a measurement of the noise variances of the squeezed and antisqueezed field quadrature of the generated squeezed light.

FIG. 11 shows a measurement of the noise variances of the squeezed and antisqueezed field quadrature of the generated squeezed light. For this measurement the output of the squeezed light source was detected by homodyne detection. In a homodyne detector the signal beam (here the squeezed beam) is interfered with a local oscillator beam, at a balanced beam splitter whose outputs are detected by photo diodes and the photo currents are subtracted. The spatial modes and the polarization angle were thereby optimized to obtain a large interference contrast. The local oscillator power was 10 mW which gave a clearance between the vacuum noise and the electronic noise of the detector of 20 dB at a sideband frequency of 5 MHz. The phase of the local oscillator was locked to the squeezed beam by means of a single sideband at 40 MHz generated by an acousto-optical modulator whose output beam was injected into the squeezed light source from the high-reflective side. The back reflection from the cavity was used to generate an error signal for the lock of the optical phase between the pump and the 40 MHz frequency shifted beam. For each measurement we obtained zero-span traces of 200 ms length using an electrical spectrum analyzer with a resolution bandwidth of 300 kHz and a video bandwidth of 100 Hz. The measurements were performed for different pump powers obtained by attenuating the output of the waveguide second harmonic generator. A theory curve based on a model was fitted to the data. The maximum obtained squeezing was 6.5 dB below vacuum noise at a pump power of 3 mW. This shows that large squeezing degrees can be obtained with a pump power level available from a waveguide second harmonic generator.

FIGURE REFERENCES

SLG. Squeezed light generator
SQL. Squeezed light
WG. Waveguide
FWL. Fundamental wavelength light
SHL. Second harmonic light
SHG. Second harmonic generator
OC. Optical cavity
PDC. Parametric down converter
LLS. Laser light source
MIR. Mirror
SQOM. Squeezed light outcoupling mirror
SHOM. Second harmonic outcoupling mirror
AOM. Acousto-optic modulator
PRB. Optical probe
PS. Phase shifter
IEP. Interacted, extracted probe
MAC. Measurement and control arrangement
OF. Optical fiber
OSEP. Optical separator
CIRC. Optical circulator

The invention claimed is:

1. A squeezed light generator for generating squeezed light, said squeezed light generator comprising:
   a waveguide being arranged to receive fundamental wavelength laser light, the waveguide comprising a second harmonic generator for generating second harmonic light from the fundamental wavelength light,
   an optical cavity resonant for both fundamental wavelength light and the second harmonic light, the optical cavity being arranged to receive the second harmonic light, and
   a parametric down converter arranged inside said optical cavity, the parametric down converter being adapted for generating said squeezed light using said second harmonic light.

2. The squeezed light generator according to claim 1, wherein the squeezed light generator comprises a receiver for receiving said fundamental wavelength light from an external laser light source.

3. The squeezed light generator according to claim 1, wherein said waveguide and said optical cavity are arranged such that said second harmonic light results from fundamental wavelength light passing through said waveguide once.

4. The squeezed light generator according to claim 1, wherein the parametric down converter is based on a chi(2) material.

5. The squeezed light generator according to claim I, wherein said squeezed light has a wavelength equal to the fundamental wavelength light.

6. The squeezed light generator according to claim 1, wherein said optical cavity comprises at least two mirrors, wherein the at least two mirrors comprises a squeezed light outcoupling mirror and a second harmonic outcoupling mirror.

7. The squeezed light generator according to claim 6, wherein said parametric down converter comprises a reflective surface forming one of the mirrors.

8. The squeezed light generator according to claim 1, wherein the optical cavity is formed by two mirrors, and wherein said parametric down converter comprises two reflective surfaces at opposite ends forming the two mirrors.

9. The squeezed light generator according to claim 1, wherein the optical cavity comprises two stand-alone mirrors and wherein the parametric down converter is positioned in the optical path between the minors.

10. The squeezed light generator according to claim 1, wherein the optical cavity is a ring cavity.

11. The squeezed light generator according to claim 1, wherein the squeezed light generator further comprises a phase modulator for modulating the phase of the fundamental wavelength laser light or the second harmonic light.

12. The squeezed light generator according to claim 1, wherein said phase modulator is integrated into the second harmonic generator.

13. The squeezed light generator according to claim 11, wherein said phase modulator comprises a piezo-electric modulator arranged with the second harmonic generator.

14. The squeezed light generator according to claim 1, wherein the squeezed light generator further comprises a squeezed angle locker configured to control a squeezing angle of the squeezed light, the squeezed angle locker comprising
   a feedback measurer arranged to measure a feedback on an optical probe extracted from the optical cavity and
   a phase shifter arranged to adjust the phase of the optical probe before the optical cavity.

15. The squeezed light generator according to claim 14, wherein the squeezed light generator further comprises an optical separator for extracting a portion of the fundamental wavelength light before the second harmonic generator for use as the optical probe.

16. The squeezed light generator according to claim 1, wherein the squeezed light generator is fiber implemented.

17. The squeezed light generator according to claim 1, wherein the squeezed light generator further comprises at least one optical circulator or beam splitter arranged to extract a portion of the second harmonic light from the optical cavity.

18. A method for generating squeezed light, said method comprising the steps of
   a) receiving fundamental wavelength light,
   b) generating second harmonic light from the fundamental wavelength light in a waveguide,
   c) receiving in an optical cavity the second harmonic wavelength light,
   d) converting the second harmonic light into squeezed light by means of a parametric down converter positioned in the optical cavity,
   wherein the optical cavity is resonant for both the fundamental wavelength light and the second harmonic wavelength light.

19. The method according to claim 18, wherein a squeezed light generator is used to generate the squeezed light, the squeezed light generator comprising:
   a waveguide being arranged to receive fundamental wavelength laser light, the waveguide comprising a second harmonic generator for generating second harmonic light from the fundamental wavelength light,
   an optical cavity resonant for both fundamental wavelength light and the second harmonic light, the optical cavity being arranged to receive the second harmonic light, and a parametric down converter arranged inside said optical cavity, the parametric down converter being adapted for generating said squeezed light using said second harmonic light.

* * * * *